(12) United States Patent
Novotney et al.

(10) Patent No.: US 10,549,869 B2
(45) Date of Patent: *Feb. 4, 2020

(54) MULTIPOINT PAYLOAD RELEASE SYSTEM

(71) Applicant: Ensign-Bickford Aerospace & Defense Company, Simsbury, CT (US)

(72) Inventors: David Novotney, Westfield, MA (US); Geoff Kaczynski, Westlake Village, CA (US); Craig Boucher, Simsbury, CT (US)

(73) Assignee: ENSIGN-BICKFORD AEROSPACE & DEFENSE COMPANY, Simsbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,282

(22) Filed: Apr. 1, 2019

(65) Prior Publication Data
US 2019/0225354 A1    Jul. 25, 2019

Related U.S. Application Data

(63) Continuation-in-part of application No. 15/263,695, filed on Sep. 13, 2016.

(51) Int. Cl.
*B64G 1/10* (2006.01)
*B64G 1/64* (2006.01)
(Continued)

(52) U.S. Cl.
CPC ............ *B64G 1/641* (2013.01); *B64G 1/10* (2013.01); *B64G 1/645* (2013.01); *F42C 15/42* (2013.01); *F42D 1/05* (2013.01)

(58) Field of Classification Search
CPC .......... B64G 1/22; B64G 1/222; B64G 1/428; B64G 1/10; B64G 1/641; B64G 1/645;
(Continued)

(56) References Cited

U.S. PATENT DOCUMENTS 6,249,063 B1  6/2001  Rudoy et al.
6,422,145 B1  7/2002  Gavrilovic et al.
(Continued)

FOREIGN PATENT DOCUMENTS

EP    1426291 A1     6/2004
WO    0171272 A2     9/2001
WO    2010117395 A1  10/2010

OTHER PUBLICATIONS

Budlong et al., 1a processor: Control system, 1977, IEEE, p. 135-179 (Year: 1977).*

(Continued)

*Primary Examiner* — McDieunel Marc
(74) *Attorney, Agent, or Firm* — Cantor Colburn LLP (57) ABSTRACT

Networked initiation systems for hold-down and release mechanisms (HDRMs) are described. The systems include a control unit, a plurality of firing control units operably connected to and in communication with the control unit, wherein each firing control unit has at least one HDRM operably connected thereto, and wherein each firing control unit is individually addressable by the control unit over an interface bus to enable selective operation of the HDRMs operably connected to the firing control units.

20 Claims, 7 Drawing Sheets

(51) Int. Cl.
*F42C 15/42* (2006.01)
*F42D 1/05* (2006.01)

(58) Field of Classification Search
CPC .............. B64G 2001/643; B64G 1/00; G05B 19/0423; G05B 19/409; G05B 2219/40513; G05F 1/66
See application file for complete search history.

(56) References Cited

U.S. PATENT DOCUMENTS

| | | | |
|---|---|---|---|
| 6,511,022 | B1 | 1/2003 | Robinson |
| 6,525,920 | B2 | 2/2003 | Rudoy et al. |
| 6,584,907 | B2 | 7/2003 | Boucher et al. |
| 6,747,541 | B1 | 6/2004 | Holt et al. |
| 6,889,610 | B2 | 5/2005 | Boucher et al. |
| 7,261,028 | B2 | 8/2007 | Devries et al. |
| 7,278,658 | B2 | 10/2007 | Boucher et al. |
| 8,136,448 | B2 | 3/2012 | Nelson et al. |
| 8,213,151 | B2 | 7/2012 | Nelson et al. |
| 8,333,514 | B2 | 12/2012 | Weimer |
| 9,115,970 | B2 | 8/2015 | Devries et al. |
| 10,124,915 | B2 * | 11/2018 | Novotney ................ B64G 1/10 |
| 2018/0072434 | A1 * | 3/2018 | Novotney ................ B64G 1/22 |
| 2018/0208331 | A1 | 7/2018 | Novotney |

OTHER PUBLICATIONS

Bodeau et al. "The Effect of Spacecraft Charging Transient in Geo Satellites", TRW Space and Technology Group, IEEE, 1989; 9 pages.

Catani et al. "Electrostatic Behaviour of Baterials in a Charging Space Environment", International Conference on Solid Dielectrics, Toulouse, France, Jul. 5-9, 2004; 11 pages.

Extended European Search Report for European Application No. 17190741.3, International Filing Date Sep. 13, 2017, dated Feb. 13, 2018, 6 pages.

Jackson, B., "XMM's Electrical Power Subsystem" ESA Bulletin, ESA Scientific and Publications Branch, Noordwijk, NL, No. 100, Dec. 1, 1999 (Dec. 1, 1999) pp. 59-63, XP000868201.

Kirby et al. "Radiation Belt Storm Probe Spacecraft and Impact of Environment on Spacecraft Design", IEEE Manuscript, 2012; 20 pages.

* cited by examiner

MULTIPOINT PAYLOAD RELEASE SYSTEM

CROSS REFERENCE TO RELATED APPLICATIONS

This application is a continuation-in-part application of the legally related U.S. patent application Ser. No. 15/263,695 filed Sep. 13, 2016, the contents of which are incorporated by reference herein in their entirety.

BACKGROUND OF THE DISCLOSURE

The subject matter disclosed herein relates in general to the initiation of devices located on vehicles (e.g., spacecraft, launch vehicle, etc.), and in particular to systems configured to control the initiation of non-energetic and/or energetic hold-then-separate devices located on the vehicle.

Launch vehicles typically have multiple stages and are used to carry payloads during travel away from the Earth's surface after the vehicles are launched, and then place or deploy the payloads into orbit or beyond. These payloads are commonly referred to as satellites if they are intended to orbit a body (e.g., Earth) after deployment, or as spacecraft if they are intended to leave the Earth's orbit after deployment. The term "space payload" will be used herein to refer to both satellites, spacecraft, and/or space-bound vehicles, devices, and/or structures and other payloads.

Space payloads typically utilize hold-down and release mechanisms ("HDRMs") (i.e., a "hold-then-separate" device) to securely hold, retain, or stow elements of the space payload during launch. Elements of space payloads may include, but are not limited to, solar arrays, antenna reflectors, radiators, instrument booms, propulsion pointing actuators, doors, sensors, or other deployable devices, etc. and/or deployable components or systems (e.g., satellites, micro-satellites, etc.). The elements may be deployed as desired by activating the hold-down and release mechanisms. As will be appreciated by those of skill in the art, deployable elements may include parts of spacecraft (e.g., deployable from the spacecraft) and spacecraft as the deployable element (e.g., as deployed from a launch vehicle or stage of a launch vehicle).

An HDRM is generally an electro-mechanical device, and in some configurations may be a "one-shot" device. In such "one-shot" configurations, after the HDRM is activated to release a stowed or held element, the HDRM either needs to be replaced, refurbished, or reset—depending on the type of technology that the HDRM employs. An HDRM is typically not a motorized device or other type of device that will return to its original state without some type of external intervention.

HDRMs are generally broadly categorized into three different types: explosive, pyrotechnic, and non-explosive—depending upon the type of activation or actuation mechanism utilized. Explosive and pyrotechnic HDRMs are also both typically referred to as energetic HDRMs, while a non-explosive HDRM or a non-pyrotechnic HDRM is also typically referred to as a non-energetic HDRM. An explosive HDRM has an activation mechanism that detonates on command, while a pyrotechnic HDRM has an activation mechanism that burns or deflagrates on command. A non-energetic HDRM is one that typically utilizes an activation mechanism such as a fuse wire or link wire that heats and weakens on command from a control unit when an amount of electrical current passes through the wire, thereby causing it to melt and break. Other types of non-energetic HDRMs utilize a shape memory alloy or utilize the volumetric expansion of certain materials, such as paraffin, when changing from solid to liquid phase. For simplicity, the discussion herein will focus on the fuse wire or link wire style non-energetic HDRMs, but it can be seen that embodiments of the present disclosure described herein would be applicable to all types of non-energetic HDRMs.

In a particular type of non-energetic HDRM, when a fuse wire breaks, a release wire that is wrapped around and thereby enclosing two parts or halves of a cylindrical split-spool assembly is released. The separation of the cylindrical split-spool assembly allows for movement of a pre-loaded device (e.g., a bolt) attached to the split-spool assembly. Release of the bolt subsequently releases a stowed element of the space payload or release of a payload entirely (e.g., satellite/micro-satellite from a launch vehicle or stage of a launch vehicle and/or released from another satellite). This type of non-energetic HDRM is commonly referred to as a split-spool release device ("SSRD"). Other common types of non-energetic HDRMs are commercially available.

In the relevant art, the relatively broad combination of a control unit, a plurality of energetic devices, and an interface bus through which signals (e.g., power and data) are sent and received as between the control unit or controller and the energetic devices (i.e., two-way communication) is generally referred to as a "networked initiation system." It is a distributed type architecture in which the various components (e.g., the control unit and the energetic devices) are located at different places on the space payload (and/or launch vehicle) and are all connected by the interface bus. This limitation in the number of communication channels limited the number of payloads that could be deployed from the spacecraft.

Networked initiation systems are known that are used strictly with various types of energetic devices. What is needed is a networked initiation system having the features described herein.

BRIEF DESCRIPTION OF THE DISCLOSURE

According to some embodiments of the present disclosure, networked initiation systems for hold-down and release mechanisms (HDRMs) are provided. The systems include a control unit and a plurality of firing control units operably connected to and in communication with the control unit, wherein each firing control unit has at least one HDRM operably connected thereto. Each firing control unit is individually addressable by the control unit over an interface bus to enable selective operation of the HDRMs operably connected to the firing control units.

In addition to one or more of the features described herein, or as an alternative, further embodiments of the networked initiation systems may include that the at least one HDRM comprises at least one non-energetic HDRM.

In addition to one or more of the features described herein, or as an alternative, further embodiments of the networked initiation systems may include that the at least one HDRM comprises at least one energetic HDRM.

In addition to one or more of the features described herein, or as an alternative, further embodiments of the networked initiation systems may include that the at least one HDRM comprises at least one energetic HDRM and at least one non-energetic HDRM.

In addition to one or more of the features described herein, or as an alternative, further embodiments of the networked initiation systems may include a system controller, wherein the system controller is operably connected to and in communication with the control unit.

In addition to one or more of the features described herein, or as an alternative, further embodiments of the networked initiation systems may include that the system controller is configured to transmit a deployment sequence to the control unit, and wherein the control unit is configured to communicate with the plurality of firing control units to operate the HDRMs to perform the deployment sequence.

In addition to one or more of the features described herein, or as an alternative, further embodiments of the networked initiation systems may include that the control unit is connected to each of the plurality of firing control units by one or more dispenser cables.

In addition to one or more of the features described herein, or as an alternative, further embodiments of the networked initiation systems may include that each of the plurality of firing control units is connected to each connected HDRM by one or more initiator cables.

According to some embodiments, vehicles for conveying and releasing one or more payloads are provided. The vehicles include a dispenser configured to retain one or more payloads, the dispenser comprising a plurality of payload release systems, a stage for carrying the dispenser, an adapter arranged between the dispenser and the stage, the adapter configured to attach the dispenser to the stage, and a networked initiation system. The networked initiation system includes a control unit and a plurality of firing control units operably connected to and in communication with the control unit, wherein each firing control unit has at least one HDRM operably connected thereto, wherein each firing control unit and HDRMs associated therewith are part of a respective payload release system. Each firing control unit is uniquely addressable by the control unit over an interface bus to enable selective operation of the HDRMs operably connected to the firing control units.

In addition to one or more of the features described herein, or as an alternative, further embodiments of the vehicles may include that the at least one HDRM comprises at least one non-energetic HDRM.

In addition to one or more of the features described herein, or as an alternative, further embodiments of the vehicles may include that the at least one HDRM comprises at least one energetic HDRM.

In addition to one or more of the features described herein, or as an alternative, further embodiments of the vehicles may include that the at least one HDRM comprises at least one energetic HDRM and at least one non-energetic HDRM.

In addition to one or more of the features described herein, or as an alternative, further embodiments of the vehicles may include a system controller, wherein the system controller is operably connected to and in communication with the control unit.

In addition to one or more of the features described herein, or as an alternative, further embodiments of the vehicles may include that the system controller is configured to transmit a deployment sequence to the control unit, and wherein the control unit is configured to communicate with the plurality of firing control units to operate the HDRMs to perform the deployment sequence.

In addition to one or more of the features described herein, or as an alternative, further embodiments of the vehicles may include that the deployment sequence is configured to operate the HDRMs at opposing positions relative to the dispenser.

In addition to one or more of the features described herein, or as an alternative, further embodiments of the vehicles may include that the system controller is located within the stage.

In addition to one or more of the features described herein, or as an alternative, further embodiments of the vehicles may include that the control unit is connected to each of the plurality of firing control units by one or more dispenser cables.

In addition to one or more of the features described herein, or as an alternative, further embodiments of the vehicles may include that each of the plurality of firing control units is connected to each connected HDRM by one or more initiator cables.

In addition to one or more of the features described herein, or as an alternative, further embodiments of the vehicles may include that the stage is an upper stage of a launch vehicle.

In addition to one or more of the features described herein, or as an alternative, further embodiments of the vehicles may include that the control unit is located within the adapter.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION OF THE DISCLOSURE

Figure 1:
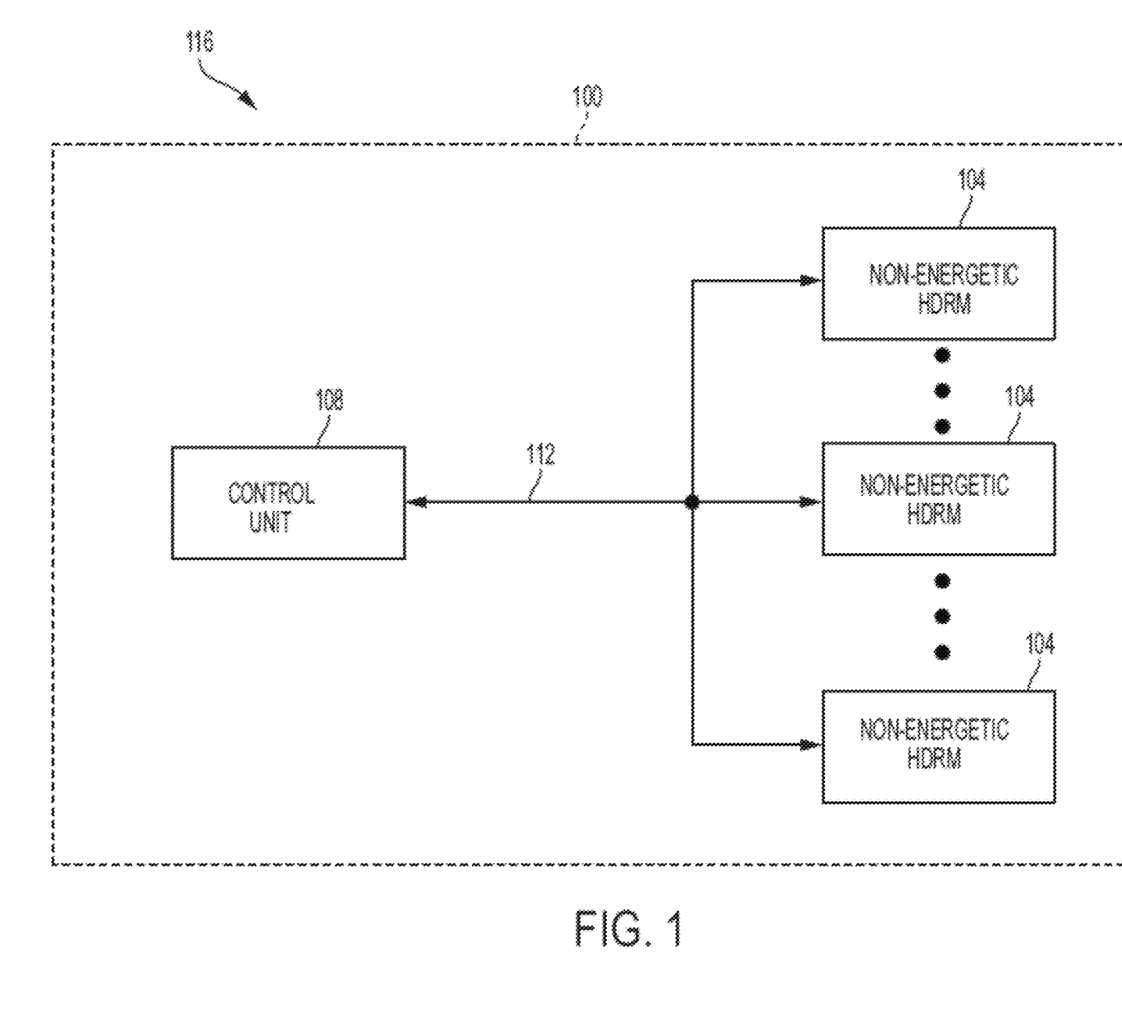
FIG. 1 is a schematic block diagram of a networked initiation system for use with one or more non-energetic HDRMs according to an embodiment of the present disclosure.

Referring to FIG. 1, a networked initiation system 100 according to an embodiment of the present disclosure includes one or more (i.e., "at least one") non-energetic hold-down and release mechanisms ("HDRMs") 104, a control unit 108, and an interface bus 112 connected between all of the HDRMs 104 and the control unit 108. In some embodiments, the HDRMs 104 and control unit 108 are connected together in a "network" type configuration by the interface bus 112 in the networked initiation system 100. The interface bus 112 allows for two-way communication between any of the HDRMs 104 and the control unit 108 connected by the interface bus 112. As used herein, the term "non-energetic" refers to the HDRMs 104 being primarily non-explosive and/or non-pyrotechnic in nature, as will be appreciated by those of skill in the art.

The networked initiation system 100 of FIG. 1 may be part of an aeronautical or aerospace type vehicle 116 utilized for travel away from the Earth's surface and/or in flight. However, embodiments described herein are not limited as such. For example, as described in more detail hereinafter, the networked initiation system 100 may be utilized in land based applications such as for various types of vehicles (e.g., an air bag deployment system in an automobile), or even stationary applications. The networked initiation system 100 may also be used in conjunction with devices or installations located underground, such as within missile silos. However, the primary discussion here will be with respect to spacecraft, space payloads, and/or launch vehicles, for simplicity and consistency.

A non-energetic HDRM 104, as appreciated by those of skill in the art, typically includes an activation mechanism (not shown) such as a link wire or fuse wire that heats and weakens on command from a control unit when an amount of electrical current passes through the link wire. The electrical current causes the link wire to fail in tension (e.g., loss of tensile strength) relatively quickly from the time the command is given, which ultimately triggers the release of a retained or stowed element (e.g., on a spacecraft). Such retained or stowed elements may be space payloads such as satellites, micro-satellites, deployable solar arrays, antennae, etc.

In some embodiments, the non-energetic HDRMs 104 (e.g., split spool release devices ("SSRDs")), may utilize an internal firing capacitor that stores an amount of electrical charge and then releases the charge on command to thereby transmit sufficient energy to break or melt the link wire in the non-energetic HDRM 104. In other embodiments, the electrical charge may be obtained directly from the interface bus 112. When used, a capacitor may be configured to store electrical energy upon receipt of an arming signal on the interface bus 112. As such, in some embodiments, the non-energetic HDRM 104 may not need any type of discrete or dedicated (i.e., separate) energetic initiator device associated therewith. The internal firing capacitor and associated circuitry within the non-energetic HDRM 104 is typically referred to as a capacitive discharge firing unit. In contrast, in some embodiments, such as those employing energetic HDRMs, as discussed in more detail hereinafter, discrete or dedicated initiator devices may be employed.

The control unit 108 may comprise a computer, processor, logic array, or similar type of electronic component and/or device and may be configured to perform the functions required by the networked initiation system 100 in embodiments of the present disclosure. In some embodiments, the control unit 108 may be integrally associated with the networked initiation system 100 (i.e., a dedicated or integral component). In other embodiments, the control unit 108 may be configured as a portion of a control unit that is configured to carry out other functions on the vehicle 116 besides those of the networked initiation system 100. For example, the control unit 108 may be embodied within the main or primary mission or flight control computer for the vehicle 116, e.g., if the vehicle 116 is a spacecraft or launch vehicle. In some embodiments, if the control unit 108 is dedicated only to the networked initiation system 100, the control unit 108 may be in communication with the mission or flight control computer for the vehicle 116.

In some embodiments of the present disclosure, the interface bus 112 may comprise a multi-wire bus including separate wires or signal lines for functions such as arming power, operation power, communication, and/or ground. When providing communication capability, the wire or wires may provide address, control, clock, and data signals thereon, and these signals may be digitally coded in a known manner (e.g., asynchronous, synchronous, v.24, bi-synchronous, Manchester data format, etc.) to allow for unique addressing of multiple devices connected to the interface bus 112. In embodiments of the present disclosure, the networked initiation system 100 may be capable of uniquely addressing one hundred or more different/unique devices (e.g., HDRMs 104, etc.) connected to the interface bus 112. Thus, each device connected to the interface bus 112 may include some amount of communication circuitry to allow each device to both receive and transmit signals (e.g., address and data) on the interface bus 112 between the control unit 108 and between other devices connected to the interface bus 112. Also, each device connected to the interface bus 112 may contain built-in-test ("BIT") circuitry to perform a self-test of the associated device at one or more defined points in time (e.g., upon power up) and to communicate the results of the BIT to the control unit 108.

Although not an inherent limitation, a typical networked initiation system 100 may include any number of devices (i.e., one or more) connected to the interface bus 112 for two-way communication with the control unit 108. However, by providing the capability to uniquely address and communicate with such a relatively large number of individual devices, embodiments of the networked initiation system 100 of the present disclosure have an advantage in that the system is scalable. This scalability creates a relatively large amount of flexibility in a networked initiation system 100 by allowing for the easy addition (and subtraction) of uniquely addressable devices within the system 100 without having to reconfigure the system 100—i.e., the controller 108 and the interface bus 112 may be "universal" with respect to the number of uniquely addressable devices. That is, when newly connected devices are added to the interface bus 112, e.g., after an initially installation, these new devices may be assigned an available unique address at the time of installation. That is, a single interface bus 112 of embodiments of the present disclosure enables customizability of the number of devices connected thereto.

Other advantages of the single interface bus 112 include that fact that such an interface bus 112 simplifies the overall system wiring. Such simplified wiring, as compared to systems with multiple buses, can enable reduced size, weight, and power requirements and may eliminate undesirable complexity of the networked initiation system 100. Furthermore, such interface bus can simplify an electrical wiring harness required within the physical makeup of the networked initiation system 100. In other embodiments, a multiple-bus configuration may be employed. In such embodiments, the different buses can enable each of the attached devices or systems to be identical (e.g., for redundancy and/or for ease of manufacturing and/or assembly).

Due to the configuration of the interface bus 112, control unit 108, and internal electronics, each of the non-energetic HRDMs 104 connected to the interface bus 112 for two-way communication with the control unit 108 may be considered to be a "smart" device. That is, each HDRM 104 may contain the payload release mechanism along with electrical or electronic circuitry needed for communication on the interface bus 112 with the control unit 108. The circuitry may include appropriate components and/or programming for arming and firing the specific HDRM 104, for BIT of the HDRM 104 as described above, and for communicating the then-current state of the HDRM 104 (e.g., armed, ready to fire, etc.) to the control unit 108. Further, the control unit 108 may communicate with the HDRMs 104 in a "command-and-response" type protocol. It should be appreciated that in other embodiments, the release mechanism and electronic circuitry may be physically separated but operably coupled to each other. In some embodiments a one-way communication may be employed, wherein a signal or command is transmitted and there may not be any need for the "response." That is, the present description and embodiments are not limited to two-way "command-and-response" type protocols.

Figure 2:
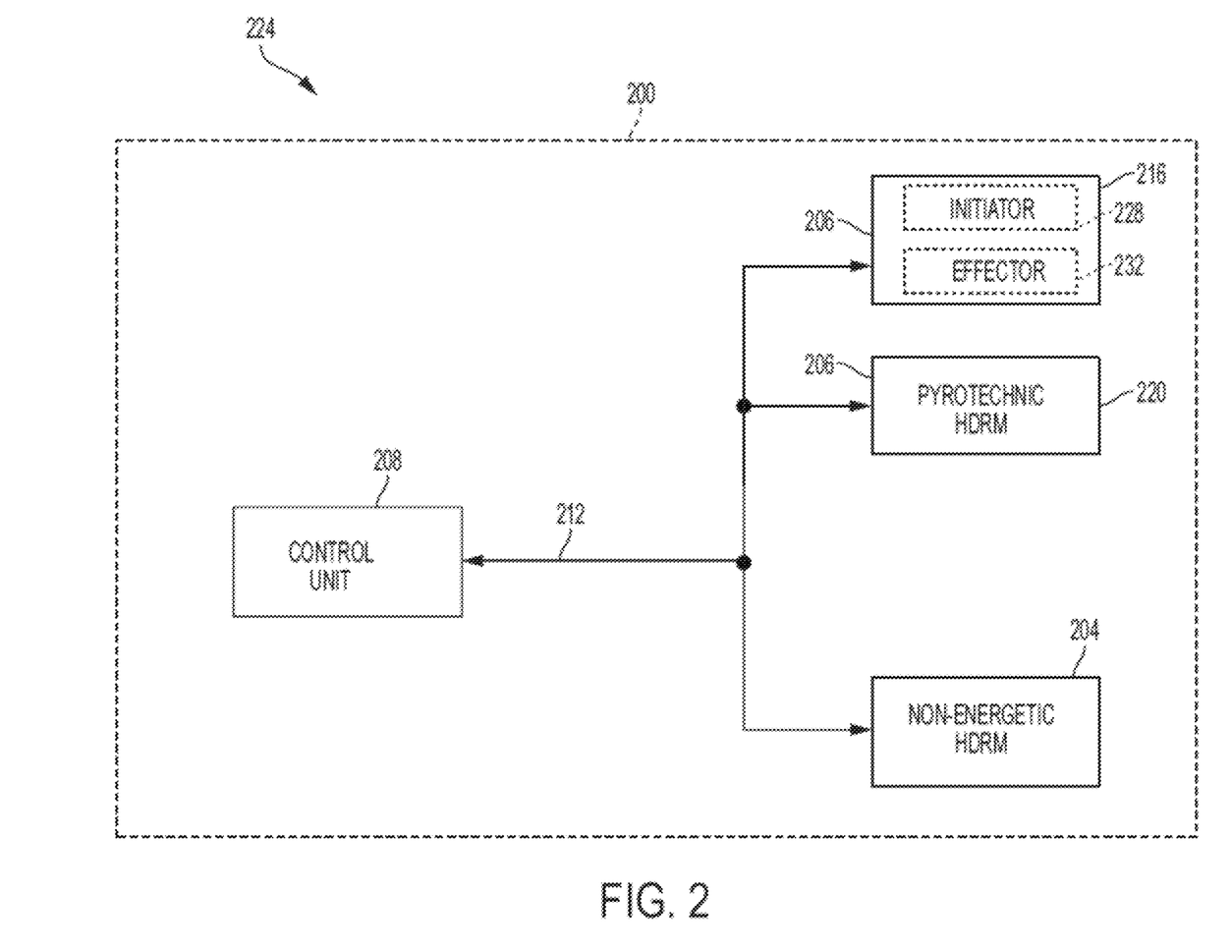
FIG. 2 is a schematic block diagram of a networked initiation system for use with one or more of each of non-energetic HDRMs and energetic HDRMs according to an embodiment of the present disclosure.

Referring now to FIG. 2, a networked initiation system 200 according to another embodiment of the present disclosure. The networked initiation system 200 includes one or more non-energetic HDRMs 204 (e.g., as described above) together with one or more energetic HDRMs 206. That is, the networked initiation system 200 includes a combination or hybrid system with both energetic and non-energetic HDRMs. The networked initiation system 200 includes a control unit 208 and an interface bus 212 connecting the HDRMs 204, 206 as described above, thereby allowing for two-way communication between all of the devices connected to the bus 212. Similar to the networked initiation system 100 of FIG. 1, all of the devices 204, 206, 208, and the bus 212 are connected together in a "network" type configuration in the networked initiation system 200 of FIG. 2, thereby enabling unique addressing and addressability of various devices of the networked initiation system 200. In networked initiation system 200, the energetic HDRMs can include explosive and/or pyrotechnic HDRMs. For example, FIG. 2 depicts both an explosive HDRM 216 and a pyrotechnic HDRM 220 as separate devices within the networked initiation system 200. The networked initiation system 200 may be part of a vehicle 224, similar to that described above.

The embodiment of the networked initiation system 200 of FIG. 2 is similar in most aspects to the embodiment of the networked initiation system 100 of FIG. 1. However, networked initiation system 200 includes the addition of the energetic HDRMs 206. As such, the description of the networked initiation system 100 given hereinabove with respect to FIG. 1 is mostly applicable to the networked initiation system 200 of FIG. 2. The addition of the energetic HDRMs 206 to the networked initiation system 200 having non-energetic HDRMs 204 results in what may be referred to as a "mixed" type of networked initiation system 200, as shown in FIG. 2.

An energetic HDRM 206 typically comprises an initiator 228 (e.g., initiating element) and an effector 232, as shown in FIG. 2 for the explosive HDRM 216. For example, for aeronautical and aerospace vehicles, the initiator 228 can be configured to control an explosive or pyrotechnic (i.e., energetic) effector 232. In some embodiments, the initiator 228 can comprise a hot bridgewire type of initiating element.

The energetic HDRMs 206 may include within a device package both the initiating element or initiator 228 and the effector 232.

Various types of explosive HDRMs 216 and pyrotechnic HDRMs 220 can include, for example, separation bolts, frangible nuts, bolt cutters, fairing release devices, actuators, engine igniters, cable cutters, etc. These types of explosive and pyrotechnic devices are commonly referred to as "reactive" effectors 232. Such reactive effectors 232 are typically coupled to electrically operated initiators 228 which, in response to suitable control signals on the bus 212, initiate or activate the effectors 232.

The initiators 228 for use in the various types of explosive HDRMs 206 may include their own communication and control circuitry. Accordingly, in some embodiments, the individual initiators 228 can possess decision-making ability, and may be referred to as "intelligent" initiators. The initiators 228 may also be equipped with sensors or other diagnostic circuitry to check for satisfactory output before functioning is permitted to occur (e.g., the aforementioned BIT).

Figure 3:
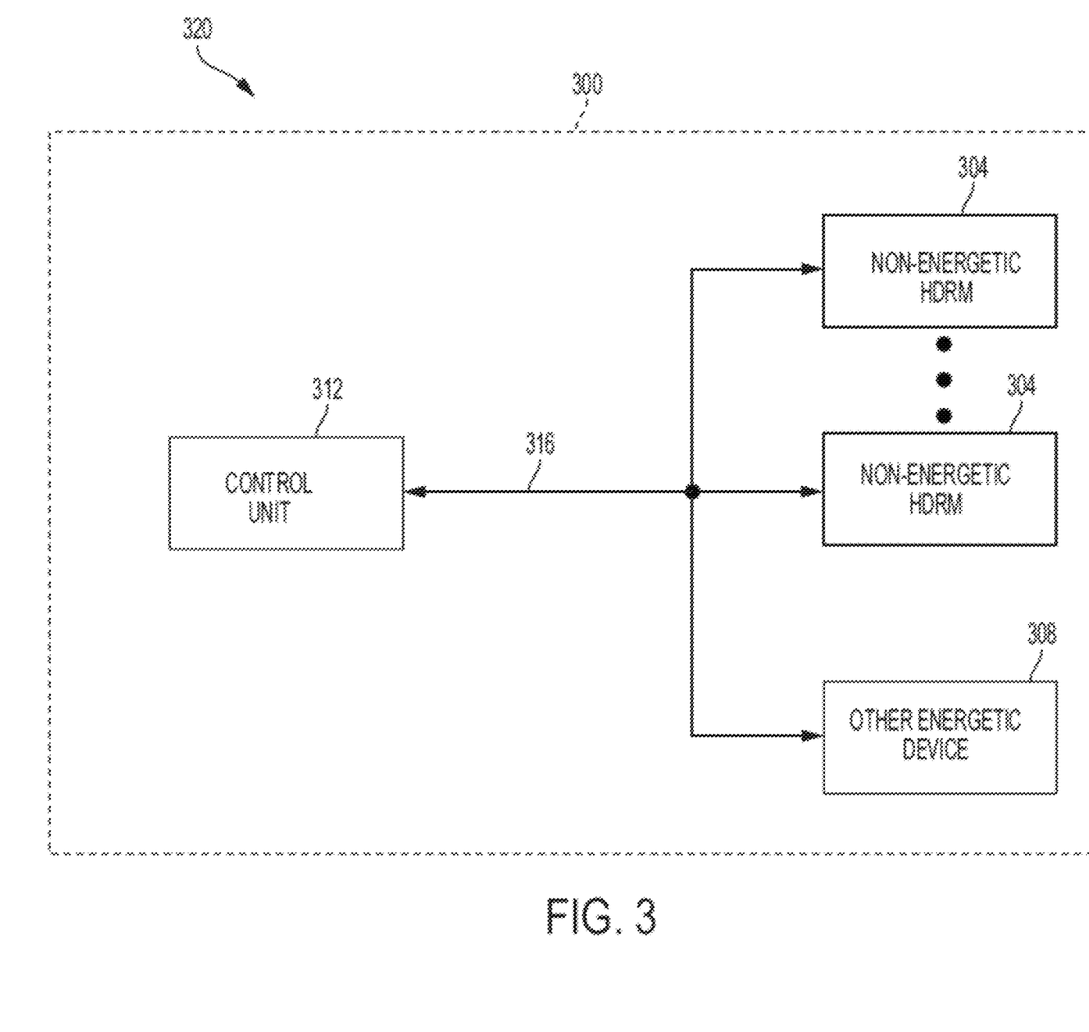
FIG. 3 is a schematic block diagram of a networked initiation system for use with one or more of each of non-energetic HDRMs and other (generic) energetic devices according to an embodiment of the present disclosure.

Referring now to FIG. 3, a networked initiation system 300 according to another embodiment of the present disclosure is shown. The networked initiation system 300 includes one or more non-energetic HDRMs 304, together with one or more other (generic) energetic devices 308 (e.g., a pyro valve). The networked initiation system 300 is substantially similar to the embodiments shown and described above, and includes a control unit 312 and an interface bus 316. Similar to the networked initiation systems described above, all of the devices 304, 308, 312, and the bus 316 are connected together in a "network" type configuration in the system 300 of FIG. 3, thereby enabling unique addressing and addressability of various devices of the networked initiation system 300. Similar to the networked initiation system 200 of FIG. 2, the networked initiation system 300 of FIG. 3 may be referred to as a "mixed" type of networked initiation system 300. FIG. 3 illustrates that in addition to energetic or non-energetic HDRMs, the networked initiation systems of the present disclosure can incorporate energetic devices and the embodiments are not limited to HDRMs only.

Figure 4:
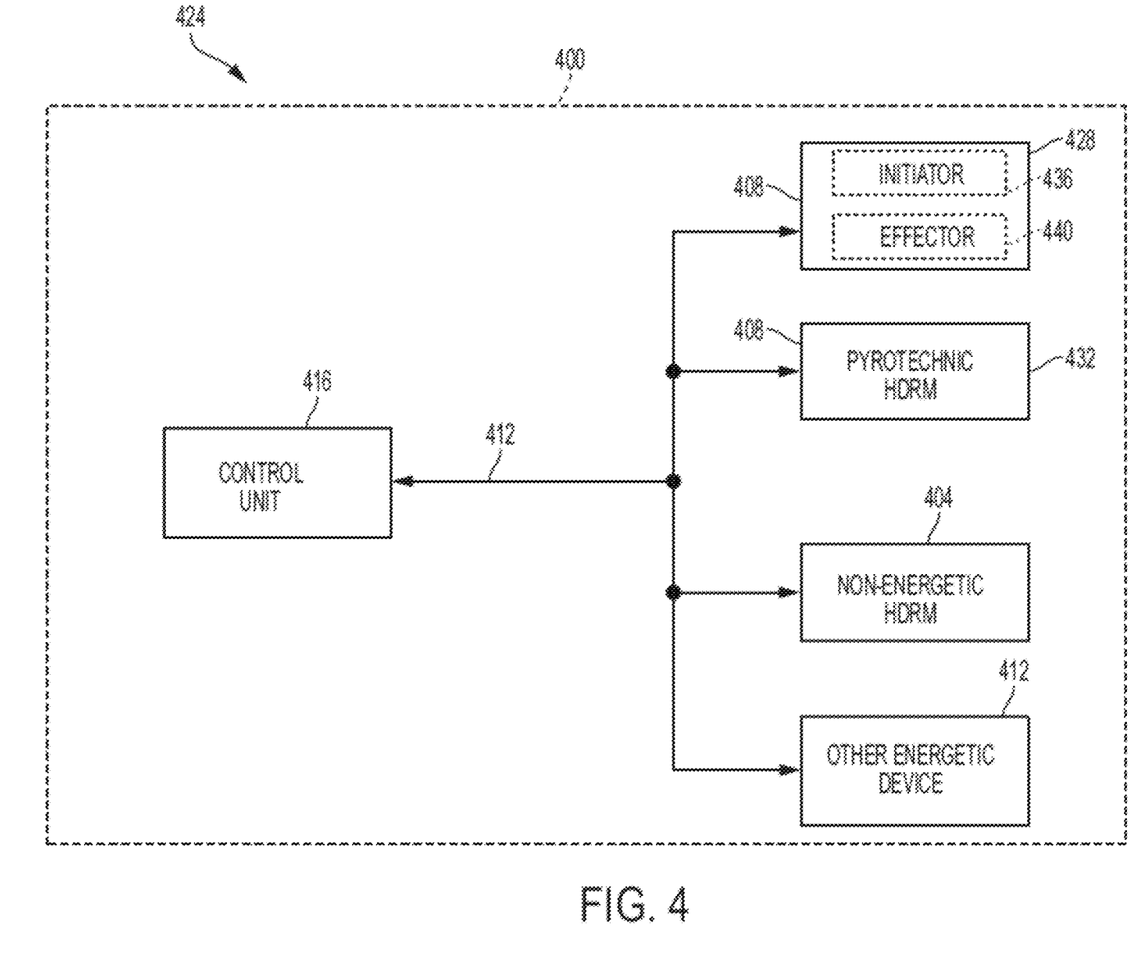
FIG. 4 is a schematic block diagram of a networked initiation system for use with one or more of each of non-energetic HDRMs, energetic HDRMs and other (generic) energetic devices according to an embodiment of the present disclosure.

For example, referring now to FIG. 4, a networked initiation system 400 in accordance with an embodiment of the present disclosure is shown. The networked initiation system 400 includes one or more non-energetic HDRMs 404, together with one or more energetic HDRMs 408, and one or more other (generic) energetic devices 412 (e.g., pyro valves). The networked initiation system 400 also includes a control unit 416 and an interface bus 420 as described above. Accordingly, all of the devices 404, 408, 412, 416, may be connected together in a "network" type configuration by the interface bus 420. The energetic HDRMs 408 may be explosive and/or pyrotechnic in nature. For example, FIG. 4 depicts both an explosive HDRM 428 and a pyrotechnic HDRM 432 as separate devices. As shown, the energetic HDRM 428 (explosive) comprises an initiator 436 and an effector 440.

The above described networked initiation systems may be employed and incorporated into a multipoint separation system. Accordingly, in accordance with some embodiments of the present disclosure, multipoint separation systems having networked initiation systems are provided. The multipoint separation system described herein may provide launch vehicles the ability to deploy multiple payloads (e.g., satellites) in any desired sequence. In one non-limiting example, the multipoint separation system receives power and orders from an upper stage of a launch vehicle and provides four-point satellite release for multiple satellites. In other embodiments, rather than requiring orders or commands, the release may be achieved through an automated process. For example, a timer may be provided to calculate a time since launch (or other event) and then release may be initiated.

Figure 5A:
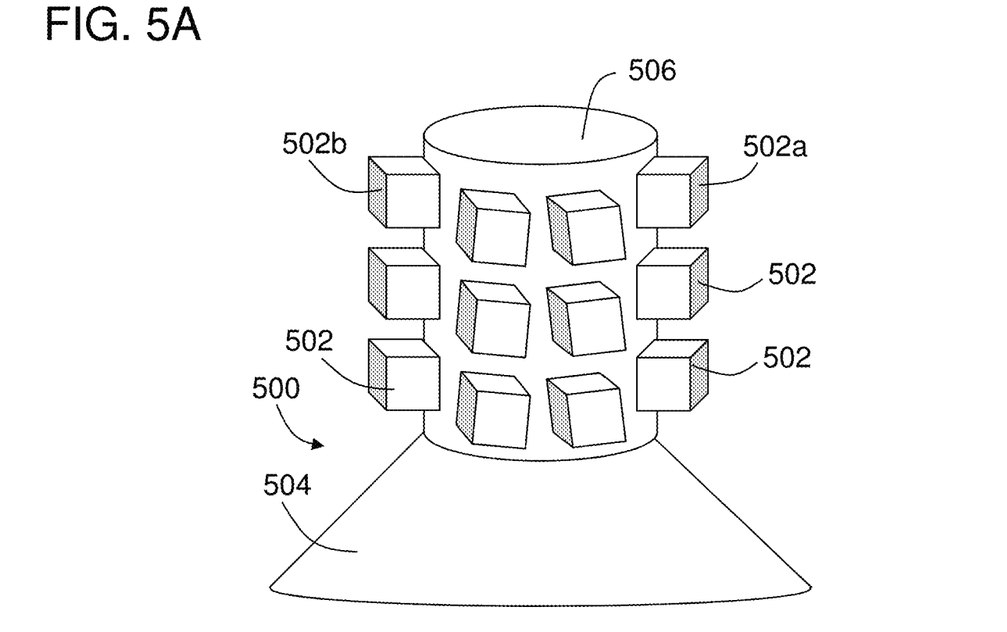
FIG. 5A is a schematic illustration of a vehicle having a plurality of payloads that may be released using multipoint payload release systems in accordance with the present disclosure.
Figure 5B:
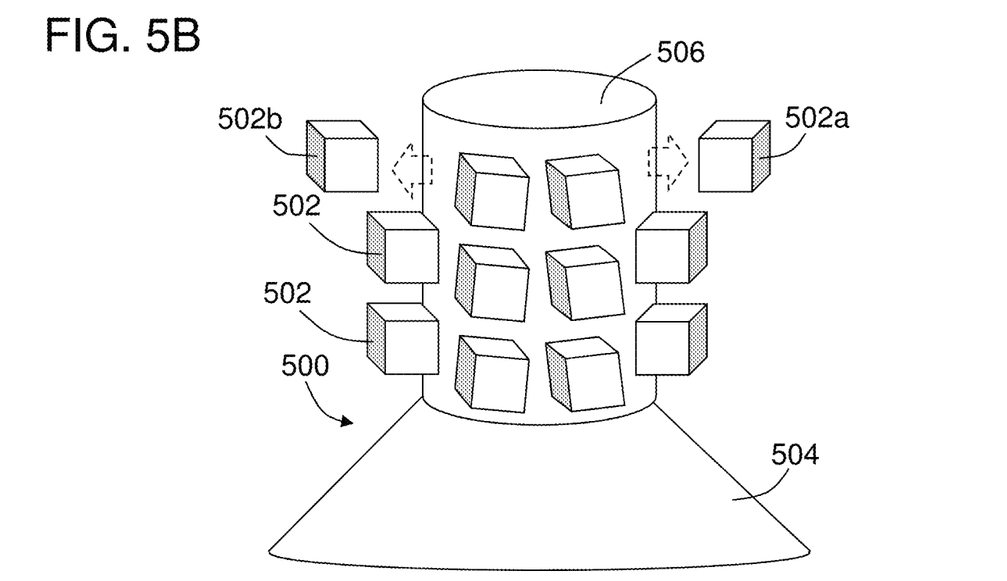
FIG. 5B is a schematic illustration of the vehicle of FIG. 5A with some of the payloads released therefrom.

For example, turning now to FIGS. 5A-5B, a vehicle 500 is shown having a plurality of payloads 502 releasably attached thereto. The vehicle 500 includes an adapter 504 and a dispenser 506. The adapter 504 is arranged to attach the dispenser 506 to a stage of the vehicle 500 (e.g., an upper stage). The adapter 504 can include and/or house various components to connect the dispenser 506 to one or more systems or components on the vehicle 500. The adapter 504 can be arranged to enable instructions or commands from a flight controller to be sent to various locations on the dispenser 506 to enable specific release of one or more of the payloads 502. The payloads 502 or networked initiation systems associated therewith may be addressable, individually and/or in groups, by the flight controller or other computer or control element/unit. As such, the vehicle 500 is configured with a multipoint separation system that allows for controlled separation of the payloads 502.

For example, as shown in FIG. 5B, two payloads 502a, 502b are shown released from the dispenser 506. The payloads 502a, 502b may be arranged opposite each other relative to the dispenser 506 when attached thereto. During a release operation, the payloads 502a, 502b may be controlled to be released simultaneously. In other embodiments all secured payloads may be released at the same time (not just a single pair), or some sub-set of the payloads may be released simultaneously (e.g., more than just two opposing payloads).

Figure 6:
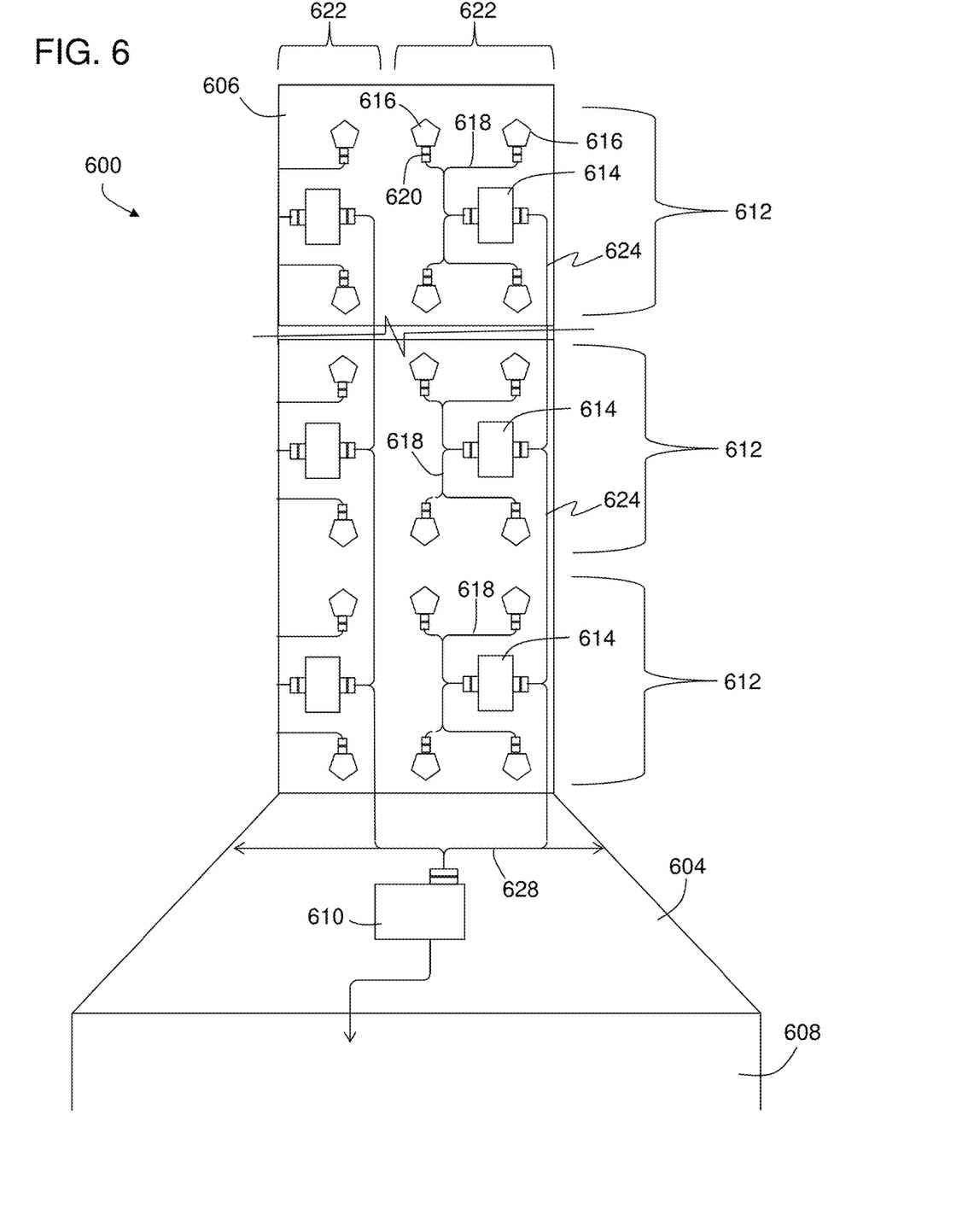
FIG. 6 is a schematic illustration of a vehicle having a multipoint separation system in accordance with an embodiment of the present disclosure.

Turning now to FIG. 6, a schematic illustration of a vehicle 600 having a multipoint separation system in accordance with an embodiment of the present disclosure is shown. The multipoint separation system includes a plurality of addressable release systems to enable controlled release of one or more payloads attached to the vehicle 600. The vehicle 600 includes an adapter 604 that operably connects a dispenser 606 to a stage 608 of the vehicle 600. The stage 608 may be an upper stage of a launch vehicle and can include various electronic and/or control components as will be appreciated by those of skill in the art (e.g., a flight controller, components for communication with the ground or a controller/operator, etc.). The dispenser 606 is configured to releasably retain or hold one or more payloads (e.g., satellites, microsatellites, etc.) using addressable HDRMs or addressable HDRM firing units, as described herein.

As shown, the multipoint separation system includes a control unit 610 that is operably connected to a plurality of payload release systems 612. In this non-limiting, illustrative embodiment, the control unit 610 is shown as installed within the adapter 604. Such configuration is not to be limiting, and in some embodiments the control unit may be installed within the dispenser 606 or within another part of the vehicle 600. In some embodiments, the control unit 610 may be a satellite dispensing sequencer. Each payload release system 612 may be configured to releasably retain or hold one or more payloads on the dispenser 606. For example, a single payload release system 612 can include multi-point retention of a single payload (e.g., satellite) or can include single-point retention of multiple payloads (e.g., microsatellites). That is, the specific configuration illustratively shown for the payload release systems 612 are not to be limiting to the retention of a payload and/or operation of release thereof.

In this illustrative non-limiting embodiment, each payload release system 612 includes a firing control unit 614 that is operably connected to four HDRMs 616 by initiator cables 618. Further, in this embodiment, an optional initiator 620 is arranged between the firing control unit 614 and the HDRMs 616. In some embodiments, the initiator 620 may be configured with a booster, as needed (e.g., for a specific type of release operation). For example, when a pyrotechnic separation nut or bolt is employed, the initiator 620 may be employed. However, in some embodiments, a separation nut or bolt may be released using an electrical initiation, and thus the initiator 620 may be omitted. That is, in some embodiments that employ an energetic HDRM, the initiator 620 may be used, and in some embodiments that employ non-energetic HDRMs, the initiator 620 may be omitted.

The set of payload release systems 612 illustratively shown in FIG. 6 may be arranged as a column 622. Each column 622 can include a specific number of payload release systems 612, each configured to retain and release one or more payloads. Although illustratively shown with only two columns 622, those of skill in the art will appreciate that any number of columns may be provided on a dispenser configured in accordance with embodiments of the present disclosure. Further, although shown with only three payload release systems 612 in each column 622, those of skill in the art will appreciate that any number of payload release systems may be arranged in a single column in accordance with embodiments of the present disclosure.

Each payload release system 612 of a given column 622, in this embodiment, may be arranged along one or more dispenser cables 624. The dispenser cables 624 may extend the length of the dispenser 606 and connect to one or more adapter cables 628. The adapter cables 628 connect the dispenser cables 624 to the control unit 610. In some embodiments, the cables (i.e., initiator cables 618, dispenser cables 624; adapter cables 628) may be provided with a redundant set (e.g., two or more similar cables along the same path). Such configurations may provide for redundancy in the system to ensure proper release of payloads from the dispenser 606. The cables 618, 624, 628 may be arranged as an interface bus, as described above. That is, the cables 618, 624, 628 can provide or form a "network" type configuration and enable addressable communication between the control unit 610 and/or electronics on the stage 608 and the firing control units 614 and/or the HDRMs 616.

The firing control units 614, as noted, may be addressable individually, collectively, and/or in groups. Accordingly, the firing control units 614 can be individually communicated with, such as by the control unit 610 or components of the stage 608 of the vehicle 600 (e.g., a system controller, flight controller, guidance and navigation computer, etc.). The firing control units 614 are configured to provide for controlled and/or selective operation of one or more of the HDRMs 616 connected thereto. That is, the firing control units 614, in some embodiments, can be configured to selectively control operation of one or more HDRMs connected thereto. For example, the firing control unit 614 can transmit power and/or commands over the initiator cables 618 to cause one or more specific HDRM 616 to operate. Thus, a specific sequence of triggering and/or release by the HDRMs 616 may be enabled. Further, in some embodiments, pairs of connected HDRMs 616 may be triggered simultaneously. In some such examples, diagonally arranged HDRMs 616 may be triggered simultaneously to enable a controlled release of a payload that is attached to the dispenser 606. Further, in some embodiments, such as in a microsatellite configuration, one or more microsatellites may be released in a given operational process (e.g., order of release). Furthermore, in some embodiments, in addition to enabling selective control of the HDRMs 616, the firing control units 614 can also enable diagnostic capability through communication with the control unit 610.

Although shown in FIG. 6 with a specific example configuration, embodiments of the present disclosure can include different arrangements, components, etc., without departing from the scope of the present disclosure. For example, some or all of the HDRMs shown in FIG. 6 (or a subset of the payload release systems) may be replaced with non-energetic HDRMs. In some such embodiments, the initiators may be eliminated from the configuration. Further, for example, instead of columnar arrangements of payload release systems, the payload release systems may be arranged on rings or in rows, such that each row may be connected and a series of rings or columns may be stacked to form the dispenser of the system. This is merely one additional example configuration and other arrangements may be employed without departing from the scope of the present disclosure. Furthermore, additional elements and/or components can be included without departing from the scope of the present disclosure. For example, as noted above, power may be supplied from the launch vehicle or a stage thereof. In some embodiments, additional, redundant, auxiliary, and/or backup power may be provided in the form of a power storage device (e.g., battery, fuel cell, etc.) or power supply generator (e.g., motor, solar panel, etc.).

Figure 7:
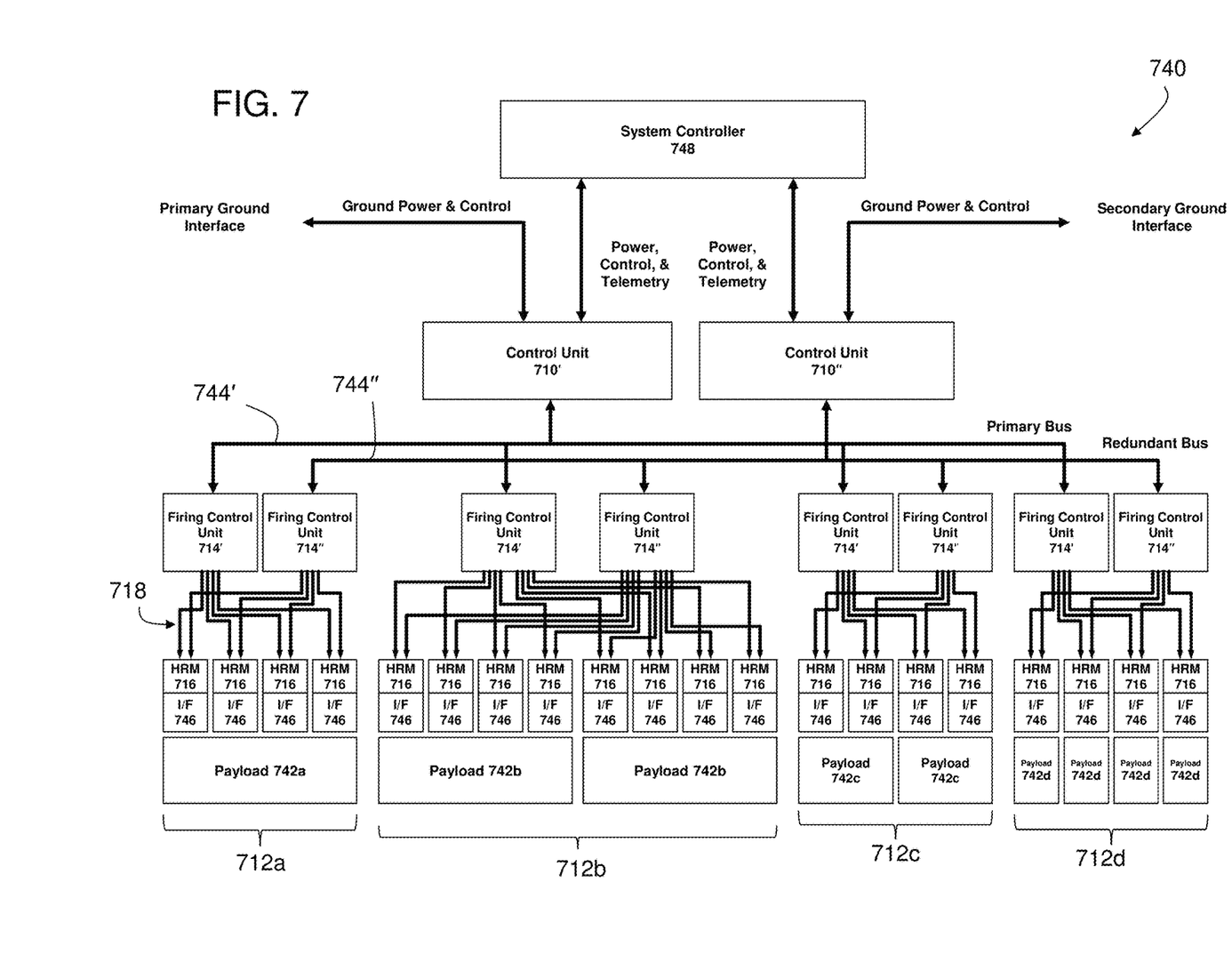
FIG. 7 is a schematic diagram of a multipoint separation system in accordance with an embodiment of the present disclosure.

Turning now to FIG. 7, a schematic diagram of a multipoint separation system 740 in accordance with an embodiment of the present disclosure is shown. The multipoint separation system 740 may be installed on a vehicle, such as shown and described above. The multipoint separation system 740 is configured to selectively release one or more payloads 742a-742d. In this illustrative embodiment, the plurality of payloads 742a-742d are connected at respective payload release systems 712a-712d. Each payload release system 712a-712d is configured to retain and selectively or operably release the associated payload(s) 742a-742d on demand or on command.'

To achieve the selective release, the multipoint separation system 740 includes addressable elements that can be selectively addressed using unique addresses (e.g., network addresses). Similar to the systems described above, a redundant set of control units 710', 710" are connected in communication with a plurality of HDRMs 716 through pairs of firing control units 714', 714". It is noted that in this illustrative embodiments, the control is provided from a primary control unit 710' and a secondary (e.g., backup or redundant) control unit 710". Further, shown as a pair, those of skill in the art will appreciate that a single control unit may be employed, or additional (e.g., beyond two) control units may be employed, without departing from the scope of the present disclosure. The control units 710', 710" may be, in some embodiments, satellite dispensing sequencers (SDS) that are configured to control the release of satellites, with the satellites being the payloads 742a-e in this example. The firing control units 714', 714" are also provided as redundant pairs for each payload release system 712a-712d. As shown, a primary firing control unit 714' is connected to the primary control unit 710' and a secondary firing control unit 714" connected to the secondary control unit 710". Similarly to the variability in number of control units, the number and arranged of firing control units may be different than that shown and described with respect to the non-limiting, illustrative and example embodiment of FIG. 7.

In some embodiments, the control units may be omitted, and a direct connection between the system controller to each firing control unit may be provided (e.g., individual commands from the system controller to provide commands to specific firing control units). Still further, in some embodiments, the primary/secondary busses may be entirely eliminated, with direct connection from each control unit to the firing control units (replacing a bus with individual direct connections).

As shown, a primary harness or cable 744' connects the primary control unit 710' to each of the primary firing control units 714' of the payload release systems 712a-d. Similarly, a secondary harness or cable 744" connects the secondary control unit 710" to each of the secondary firing control units 714' of the payload release systems 712a-d. Each of the firing control units 714', 714" is operably connected to the HDRMs 716 by initiator cables 718, as described above. The initiator cables 718 can be used to transmit a signal and/or power from the respective firing control units 714', 714" to an HDRM 716 to initiate or trigger a release thereof. In some embodiments, and as shown in FIG. 7, a load interface 746 may be arranged between the respective HDRMs 716 and the payloads 742a-d. The load interface 746 may be a bolt, a framing support, a bracket, etc. that is configured to retain the payloads 742a-d (or a portion thereof) to a respective HDRM 716.

In operation, one or both of the control units 710', 710" is configured to send a signal to one or more specific primary firing control units 714' (or pair of control units 714', 714"). Upon receiving a command from the control unit 710', 710", the instructed firing control units 714', 714" will cause respective or associated HDRMs 716 to actuate or operate to release a respective payload 742a-742d. Because the control firing units 714', 714" are addressable, the control units 710', 710" can instruct specific payloads 742a-742d to be released in a particular sequence or order. The sequence may be preprogrammed and/or stored within the control units 710', 710" or may be received as a command from another component, such as a system controller 748 (which may be configured as a redundant or multi-control/controller system). For example, in some embodiments, a primary system controller and a secondary system controller may be provided for a redundant system configuration. The system controller 748 may be part of a vehicle control system (e.g., flight controller, guidance & navigation computer, etc.), and may be located on a stage of a launch vehicle (e.g., upper stage). Power, control, and/or telemetry may be provided from the system controller 748 and/or other components of a spacecraft (e.g., upper stage). Further ground power and control may be connected to through ground interfaces, as illustratively shown. In some embodiments, one or more control units (e.g., control units 710', 710") may be integrated into a system controller (e.g., system controller 748).

As noted, the multipoint separation system 740 is configured for controlled release of the payloads 742a-d. The control units 710', 710" may be pre-programmed to transmit commands to the various firing control units 714', 714", respectively. The programming may be stored on a memory or other storage device, as will be appreciated by those of skill in the art. The programming may be executed using a processor or general purpose computing elements, as known in the art. The control units 710', 710", as noted above, are operably connected to the system controller 748. In operation, orders or commands may be received at the control units 710', 710" from the system controller 748a through cables or other network connections, as described above or as known in the art. As the sequence is performed, commands may be sent from the control units 710', 710" to specific firing control units 714', 714" of the payload release systems 712a-712d over the harnesses or cables 744', 744". The transmissions from the control units 710', 710" may include addresses or unique identifiers such that the command is received at specific, addressed firing control units 714', 714".

In one non-limiting example of a firing sequence and operation of a multipoint separation system in accordance with an embodiment of the present disclosure, a specific timing of release may be provided. For example, the control unit (e.g., control units 710', 710") may be powered on once a vehicle (e.g., spacecraft, launch vehicle, etc.) reaches a specific destination (e.g., altitude, orbit, duration of flight, etc.). In one such example, the destination may be an orbit selected for a launch vehicle carrying a plurality of satellites as payloads 742a-742d to be deployed into space. In this example, the control unit 710', 710", is powered on when the vehicle reaches orbit (i.e., the control unit is unpowered during launch and flight). Once on-orbit, the control unit 710', 710" may receive signals or commands from the system controller 748 (e.g., a guidance & navigation computer) located on an upper stage or other portion of the vehicle. The command may instruct the control unit 710', 710" to perform a deployment sequence to deploy the payloads 742a-742d.

As shown in FIG. 7, the different payload release systems 712a-712d may have different configurations. For example, a first payload release system 712a has a single payload 742a that is connected at four distinct HDRM 716 with respective load interfaces 746. A release command can be provided to trigger operation (and release) at the four separate load interfaces 746 simultaneously or in some time delayed manner, as will be appreciated by those of skill in the art. The first payload release system 712a includes a primary firing control unit 714' and a secondary firing control unit 714", with each of the firing control units 714', 714" of the first payload release system 712a being operably connected to each HDRM 716 and load interface 746 of the first payload release system 712a.

A second payload release system 712b has two separate payloads 742b operably connected to a set of firing control units 714', 714", but each payload 742b includes a separate set of four HDRM 716 with respective load interfaces 746. The control provided to the firing control units 714', 714" from the control units 710', 710" over the cables 744', 744" may enable simultaneous release of the payloads 742b or may be separate releases, but using the common firing control units 714', 714".

A third payload release system 712c is configured with two payloads 742c, with each payload 742c attached or held by two HDRM 716 and associated payload releases 746. In such configuration, firing control units 714', 714" can be controlled or operated to release the payloads 742c simultaneously or separately, through activation of specific HDRMs 716 of the third payload release system 712c.

A fourth payload release system 712d is configured with four distinct payloads 742d, with each payload 742d retained by a single HDRM 716 and payload interface 746. The HDRMs 716 are operably connected to a pair of redundant firing control units 714', 714", to enable selective release of the payloads 742d.

As will be appreciated by those of skill in the art, the various configurations shown and described with respect to FIG. 7 are not to be limiting, but rather such configuration is provided for illustrative and explanatory purposes. Various of the configurations may be selected for any number of addressable payload release systems that are employed on a dispenser. That is, a mix-and-match approach is enabled by embodiments described herein, such that any number and/or configuration of payload release systems may be installed and employed on a single dispenser. Such configurability enables advantages over prior systems. For example, because the payload release systems may be addressable, and even parts of the payload release system may be directly addressable, uniform components may be manufactured such that different configurations can be made in an ad hoc fashion, without requiring a specific system to be manufactured and configured for each unique situation, thus reducing costs and time for deployment. Further, embodiments provided herein enable versatility to change out components, if necessary, without the need to completely rebuild or restructure the entire system as a whole.

In one non-limiting example, a deployment sequence as employed with an embodiment of the present disclosure may be as follows: at time 0.0 s, the firing control units may be powered on and status verified. Verification may be performed for each firing control unit and the HDRMs associated therewith. As such, the verification process may employ an address system, wherein each firing control unit and/or HDRM may be uniquely addressed for verification. At time +1.0 s, a set of firing control units may be armed (e.g., firing capacitors may be charged) for specific payloads. At time +2.0 s a first diagonal pair of HDRMs of the firing control units that are armed may be fired, thus releasing a portion of a payload. At time +2.1 s the same firing control units may be rearmed (e.g., firing capacitors may be recharged). At time +3.1 s a second diagonal pair of HDRMs of the firing control units that are rearmed may be fired, thus releasing the payload. At time +3.2 s, the firing control units may be powered off, and the control unit may wait for further deployment commands from the system controller. In some embodiments, rather than awaiting further instructions, the initial instruction may trigger a pre-programmed sequence that does not require additional comments from the system controller. In some embodiments, four payloads may be released simultaneously, with pairs of deployed payloads being opposite each other with respect to a dispenser to which the payloads are attached. That is, the sequence of deployment can be set to operate the HDRMs that are at opposing positions relative to the dispenser (e.g., at 180 degrees when two are operated, at 120 degree positions about the dispenser when three are operated, etc.).

In another non-limiting example, the control units may be powered on from launch. A sequence number (e.g., for deployment sequence) may be retained in non-volatile and/or non-corruptible memory of the control unit. At some point (e.g., on orbit), the control unit may receive commands or orders from the system controller (e.g., three orders that are voted two of three). The control unit will receive and validate the orders. The control units will then powers-on the bus interface circuits, and in turn power on the firing control units. Once power has been provided, the system will execute a current deployment sequence by transmitting commands from the control unit(s) to the respective and specific firing control units. Once the deployment operation is completed (e.g., a payload is released), the control unit(s) will power-off the firing control units and the bus interface circuits. The control unit(s) will also increment a sequence number, such that a subsequent or next sequence may be performed upon command. Further, once the deployment is complete, the control unit(s) can transmit deployment and/or sequence information to the system controller.

In some embodiments, as noted above, a system controller may be configured to transmit a deployment sequence to a control unit to initiate and carry out a deployment operation. In other embodiments, for example, a deployment sequence may be pre-programmed into the control unit with the system controller sending a "go" or activate command that would command the control unit to execute the pre-programmed deployment sequence. Further still, in some embodiments, the system controller may send and/or repeat the same command to the control unit, with the control unit executing the next deployment sequence each time a command is received from the system controller. The command from the system controller can be a discrete command, a combination of discrete commands, or a serial data command. Further, in some embodiments, the system controller could send a deployment sequence to the control unit.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A networked initiation system for hold-down and release mechanisms (HDRMs), the system comprising:
   a control unit;
   a plurality of firing control units operably connected to and in communication with the control unit, wherein each firing control unit has at least one HDRM operably connected thereto;
   wherein each firing control unit is individually addressable by the control unit over an interface bus to enable selective operation of the HDRMs operably connected to the firing control units.

2. The system of claim 1, wherein the at least one HDRM comprises at least one non-energetic HDRM.

3. The system of claim 1, wherein the at least one HDRM comprises at least one energetic HDRM.

4. The system of claim 1, wherein the at least one HDRM comprises at least one energetic HDRM and at least one non-energetic HDRM.

5. The system of claim 1, further comprising a system controller, wherein the system controller is operably connected to and in communication with the control unit.

6. The system of claim 5, wherein the system controller is configured to transmit a deployment sequence to the control unit, and wherein the control unit is configured to communicate with the plurality of firing control units to operate the HDRMs to perform the deployment sequence.

7. The system of claim 1, wherein the control unit is connected to each of the plurality of firing control units by one or more dispenser cables.

8. The system of claim 1, wherein each of the plurality of firing control units is connected to each connected HDRM by one or more initiator cables.

9. A vehicle for conveying and releasing one or more payloads, the vehicle comprising:
   a dispenser configured to retain one or more payloads, the dispenser comprising a plurality of payload release systems;
   a stage for carrying the dispenser;
   an adapter arranged between the dispenser and the stage, the adapter configured to attach the dispenser to the stage; and
   a networked initiation system comprising:
   a control unit; and
   a plurality of firing control units operably connected to and in communication with the control unit, wherein each firing control unit has at least one HDRM operably connected thereto, wherein each firing control unit and HDRMs associated therewith are part of a respective payload release system;
   wherein each firing control unit is uniquely addressable by the control unit over an interface bus to enable selective operation of the HDRMs operably connected to the firing control units.

10. The vehicle of claim 9, wherein the at least one HDRM comprises at least one non-energetic HDRM.

11. The vehicle of claim 9, wherein the at least one HDRM comprises at least one energetic HDRM.

12. The vehicle of claim 9, wherein the at least one HDRM comprises at least one energetic HDRM and at least one non-energetic HDRM.

13. The vehicle of claim 9, further comprising a system controller, wherein the system controller is operably connected to and in communication with the control unit.

14. The vehicle of claim 13, wherein the system controller is configured to transmit a deployment sequence to the control unit, and wherein the control unit is configured to communicate with the plurality of firing control units to operate the HDRMs to perform the deployment sequence.

15. The vehicle of claim 14, wherein the deployment sequence is configured to operate the HDRMs at opposing positions relative to the dispenser.

16. The vehicle of claim 13, wherein the system controller is located within the stage.

17. The vehicle of claim 9, wherein the control unit is connected to each of the plurality of firing control units by one or more dispenser cables.

18. The vehicle of claim 9, wherein each of the plurality of firing control units is connected to each connected HDRM by one or more initiator cables.

19. The vehicle of claim 9, wherein the stage is an upper stage of a launch vehicle.

20. The vehicle of claim 9, wherein the control unit is located within the adapter.

* * * * *